United States Patent [19]
Bidan et al.

[11] Patent Number: 5,264,157
[45] Date of Patent: Nov. 23, 1993

[54] MATERIAL BASED ON AN ELECTRONIC CONDUCTIVE POLYMER INCORPORATING MAGNETIC PARTICLES AND ITS PRODUCTION PROCESS

[75] Inventors: Gérard Bidan, Grenoble; Sylvie Chardon, Echirolles, both of France; Etienne Hannecart, Tervuren, Belgium; René Massart, Cesson, France

[73] Assignee: Commissariat a l'Energie Atomique, France

[21] Appl. No.: 747,526

[22] Filed: Aug. 20, 1991

[30] Foreign Application Priority Data

Aug. 31, 1990 [FR] France .................. 90 10883

[51] Int. Cl.$^5$ ............................................ H01R 1/00
[52] U.S. Cl. .................................. 252/519; 252/518; 252/62.54; 564/779
[58] Field of Search .......... 252/519, 62.54, 500, 252/512, 518, 62.56; 524/779, 785, 790

[56] References Cited

U.S. PATENT DOCUMENTS

| | | | |
|---|---|---|---|
| 3,916,038 | 10/1975 | Yamaguchi et al. | 252/62.54 |
| 4,069,073 | 1/1978 | Tadokoro et al. | 252/62.56 |
| 4,076,861 | 2/1978 | Furukawa et al. | 252/62.54 |
| 4,329,241 | 5/1982 | Massart | 252/62.52 |
| 4,334,887 | 6/1982 | Frank et al. | 252/62.54 |
| 4,339,337 | 7/1982 | Tricot et al. | 252/62.54 |
| 4,421,660 | 12/1983 | Solc nee Hajna | 252/62.54 |
| 5,064,877 | 11/1991 | Nass et al. | 522/172 |

FOREIGN PATENT DOCUMENTS

0223336 5/1987 European Pat. Off.
0336468 10/1989 European Pat. Off.

OTHER PUBLICATIONS

Japanese Journal of Applied Physics, vol. 24, No. 9, Sep. 1985, Tokyo, JP, pp. L687-L688; K. Yoshino et al.: "Preparation of Magnetic Conducting Polymer and Its Characteristics".
Patent Abstracts of Japan, vol. 11, No. 106 (C-414)(2553) Apr. 3, 1987 & JP-A-61 254669 (Katsumi Yoshino, Nov. 12, 1986.
Journal of the Electrochemical Society, vol. 137, No. 6, Jun. 1990, Manchester, New Hampshire, pp. 1793–1796; K. Kawal et al.: "Electrochemical Synthesis of Polypyrrole Films Containing TiO2 Powder Particles".

Primary Examiner—Paul Lieberman
Assistant Examiner—M. Kopec
Attorney, Agent, or Firm—Pearne, Gordon, McCoy & Granger

[57] ABSTRACT

The invention relates to an electricity conducting material having magnetic properties constituted by an electronic conductive polymer in which are homogeneously dispersed permanent magnetic particles bonded chemically or physicochemically to the polymer or serving as a polymer dopant.

This material can be prepared by the polymerization
a) of a monomer such as pyrrole in the presence of a colloidal suspension of charged magnetic particles, or
b) a monomer such as pyrrole, chemically bonded to a magnetic particle.

15 Claims, 3 Drawing Sheets

FIG. 3 (FFCC)

FIG. 4 (FFCC)

FIG. 5 (PPy-FFCC)

FIG. 6 (FFAZ)

FIG. 7 (PPy-FFAZ)

FIG. 8 (PPy-FFCC)

FIG. 9 (PPy-FFAZ)

MATERIAL BASED ON AN ELECTRONIC CONDUCTIVE POLYMER INCORPORATING MAGNETIC PARTICLES AND ITS PRODUCTION PROCESS

The present invention relates to an electricity conducting material also having magnetic properties. More specifically, it relates to an electricity conducting material constituted by an electronic conductive polymer in which are homogeneously distributed magnetic particles.

Materials of this type produced in the form of thin films with a controllable thickness and which may or may not be deposited on a support, or in powder form are of great interest for the production of information storage elements because, as a result of their conductive and magnetic properties, they permit multiple information storage.

In order to produce such materials, it is necessary to immobilize the magnetic particles in an electronic conductive polymer by homogeneously dispersing them therein and to be able to regulate the quantity of dispersed magnetic particles to the desired value.

Electronic conductive polymers are known such as polypyrrole, polythiophene and polyaniline. They can be prepared by chemical or electrochemical oxidation of the corresponding monomers, which leads to polymers doped by an appropriate ion, generally an anion. It is possible to use particular anions such as heteropolyanions in order to improve the use of the catalytic properties of these heteropolyanions by inclusion in a conductive polymer, as described in FR-A-2 625 598.

In the latter document, doping takes place by the heteropolyanion during the synthesis of the electronic conductive polymer by adding said heteropolyanion to the solution of monomers used, e.g. a solution in acetonitrile. Therefore this doping can easily be carried out during synthesis as a result of the small size (10 Å) and the anionic character of the dopant to be included in the polymer.

However, in the case of magnetic particles, it is not a naturally anionic dopant and the particles have larger sizes (100 Å). In addition, certain problems are caused by their inclusion during polymer synthesis.

Yoneyama et al have described in Chemistry Letters, 1989, pp. 1067-1070, the incorporation of metal oxide particles into polypyrrole films by negatively charging these oxide particles so that they can fulfil the dopant function like heteropolyanions. In this case, for the oxide particles to be negatively charged, it is necessary to carry out the polymerization of the pyrrole in an aqueous solution having an appropriate pH above the isoelectric point of the oxide, but below 7. It follows and as has been recently indicated in J. Electrochem. Soc., 1990, vol. 137, pp. 1793-1796, the polypyrrole synthesized under such high pH conditions is often a poor conductor or may even be an insulator, which inhibits any electrochemical growth of the film.

On dispersing magnetic particles such as oxide particles for formula $Fe_2MO_4$, in which M is a divalent metal atom, in an aqueous solution, it is possible to obtain surface charged particles, but the nature of the charge varies as a function of whether it is an acid medium or a basic medium. Thus, these particles become cationic in the acid medium, whereas they are anionic in the basic medium and completely discharged at a pH of approximately 7.5. This charge of the particles is due to the absorbtion of the OH ligand coming from the aqueous solution on the surface iron atoms and said ligand gives the particles negative charges in the alkaline medium and positive charges in the acid medium.

Moreover, in order that the particles are homogeneously dispersed in the polymer during the synthesis thereof, it is necessary for them to remain suspended in the medium used for the polymerization, i.e. there must be no possibility of flocculation of the suspension.

Thus, in the case of magnetic particles, it is necessary to respect very precise conditions to ensure that the particles are negatively charged and remain in suspension, which is rarely compatible with the conditions used for the synthesis of electronic conductive polymers.

The present invention specifically relates to an electronic conductive polymer in which are dispersed permanent magnetic particles, which can be prepared by using a number of different media from a suspension of magnetic particles adapted to these different media.

According to the invention, the electricity conductive material having magnetic properties, comprises an electronic conductive polymer in which are homogeneously dispersed permanent magnetic particles chemically or physicochemically bonded to the polymer or which serve as a polymer dopant.

The electronic conductive polymers used in the invention can be conjugate polymers such as polypyrroles, polythiophenes and polyanilines. It is possible to use polymers of substituted derivatives of thiophene, pyrrole or aniline, such as polyalkyl thiophenes and in particular poly(alkyl in $C_6$ to $C_{12}$) thiophenes.

For example, the substituted derivatives of pyrrole, thiophene and aniline can be in accordance with the formula:

(I)

(II)

in which X represents S or $NR^3$ with $R^3$ being a hydrogen atom, an alkyl radial or an aryl radical and $R^1$ and $R^2$, which can be the same or different, represent a hydrogen atom, a straight or branched alkyl radical, e.g. an alkyl radical with 2 or 20 carbon atoms, optionally substituted by groups with a nitrogen, sulphur or oxygen atom, or an aryl radical, e.g. phenyl or alkylpyridine. $R^1$ and $R^2$ can also represent negatively or positively charged groups, e.g. acid or basic groups.

According to the invention, it is also possible to use conjugate polymers obtained from paraphenylene diamine, acetylene, benzene and their substituted derivatives. Soluble polymers (alkyl thiophene polymers) polymers with soluble precursors (polyparaphenylene vinylene) or in latex emulsion can also be used, particularly for chemical synthesis.

The permanent magnetic particles included in the electronic conductive polymer are preferably oxide particles of formula $Fe_2MO_4$, in M is a divalent metal atom chosen from among Fe, Co, Mn, Cu and Ni. For example, it is possible to in particular use iron oxide γ-Fe₂O₃ (maghemite). These particles generally have small sizes between 5 and 20 nm.

In the conductive material according to the invention, the quantity of magnetic particles is present in the conductive polymer is chosen as a function of the properties which it is wished to obtain.

The materials according to the invention can be prepared either by direct polymerization processes from an appropriate monomer, in the presence or absence of a colloidal suspension of the magnetic particles to be included, or by a process making it possible to exchange the doping ions present in an already produced electronic conductive polymer by charged magnetic particles.

Direct polymerization processes can be performed in three different ways.

Thus, according to a first embodiment of the process according to the invention, it consists of polymerizing a precursor monomer of the electronic conductive polymer in a medium comprising a colloidal suspension of magnetic particles to which are fixed negatively charged organic groups. In this first embodiment, use is consequently made of a colloidal suspension of magnetic particles carrying on the surface negative charges, so that these particles serve as dopant ions for the polymer.

These charges can come from complexing agents able to complex an element of the magnetic particle, whilst still retaining a free anionic group, e.g. an acid group such as $COO^-$, $SO_3^-$, $OSO_3^-$ or $PO_4^{2-}$. When the magnetic particle contains iron, it is possible to use iron complexing agents, which also have an available acid group.

Examples of such complexing agents are polyacids, saturated or unsaturated aliphatic polyalcohols, whereof one or more carbons carry both a carboxylic acid function and an alcohol function, such as citric, tartaric, tartronic, mesoxalic, malic and glutaric acid.

These complexing agents can also be non-aliphatic and in particular aromatic compounds, in which case the OH group can be further removed from the carboxyl group, as in the case of 5-sulphosalicylic acid, calconcarboxylic acid, i.e. 3-hydroxy-4-(2-hydroxy-4-sulpho-1-naphthylazo)-2-naphthalene carboxylic acid of formula:

and the chromium azurol S of formula:

Certain compounds containing heterocycles are also fixed, particularly ascorbic acid.

These iron complexing molecules can also comprise a —SH group in place of the —OH group, e.g. 2,3-dimercaptosuccinic acid, which can complex on the particles.

The main condition ensuring that the particles, when complexed, can be used according to the invention is that the complexing molecule, once fixed, still has at least one ionizable function capable of negative charging.

Modified magnetic particles incorporating negative charges can be prepared by treating with an appropriate complexing agent an aqueous suspension of unmodified magnetic particles, such as the magnetic fluids described in FR-A-2 461 521, which are aqueous solutions of Fe(III) polyoxoanions and at least one metal with a degree of oxidation (II) with an associated cation.

Thus, it is possible to prepare magnetic particles to which are fixed citrate anions by adding citric acid to a suspension of $MFe_2O_4$ particles in nitric acid, by resuspending the precipitate obtained in water and by adding tetramethyl ammonium hydroxide.

This gives magnetic particles linked by a coordination bond to the fixed anions, whose charges are compensated by a counterion such as $N^+(CH_3)_4$ present in the solution. As a result of the choice of the fixed anion, it is possible to obtain a stable suspension of particles, which retain their negative charges under the chosen polymerization conditions. Therefore these modified particles are different from the starting polyoxoanions and make it possible to use different media and different polymerization conditions, which could not be envisaged with unmodified particles.

According to the invention, the polymerization of the monomer in the presence of the colloidal suspension of modified magnetic particles can be carried out either chemically or electrochemically.

When operating electrochemically, the colloidal suspension of modified magnetic particles can serve as the electrolyte, but it is also possible to add to the polymerization medium conventional electrolytes such as perchlorates, e.g. lithium or tetrabutyl ammonium perchlorate, chlorides, e.g. sodium chloride, sulphonates, e.g. sodium sulphonate polystyrene $(C_4H_9)_4N^+CF_3$—$SO_3$—, $Na^+CH_3$—$C_6H_5$—$SO_3$—, $(C_2H_5)_4N^+CF_3SO_3$— and sulphates such as $Na^+CH_3(CH_2)_{11}$—$OSO_3$—.

In order to carry out the oxidation of the monomer electrochemically, a potential difference is applied between the two electrodes immersed in the solution of the monomer, which comprises the colloidal suspension of magnetic particles and thus formation takes place directly on one of the electrodes of an electronic conductive polymer doped by charged magnetic particles.

Polymerization by electrochemical oxidation of the monomer leads to a charged polymer and corresponds to the following reaction diagram in the case of the pyrrole:

The positive charges of the polymer are compensated by anions from the electrolyte, which serves as the dopant. In the invention, these doping ions are constituted by negatively charged, modified magnetic particles, which are very homogeneously distributed in the conductive polymer.

When a conventional electrolyte is associated with the colloidal suspension of modified magnetic particles, competition exists between the magnetic particles and the anion of the added electrolyte for the positively charged sites of the polymer, which leads to a polymer having two doping ion types. In this way the quantity of magnetic particles present in the polymer form can be regulated by appropriately choosing the added electrolyte quantity. The electrodes used for depositing the conductive polymer can be of different types. They can e.g. be of platinum, carbon, gold or mixed tin and indium oxide.

The magnetic oxide particles of formula $Fe_2MO_4$ used in the first embodiment of the invention can be prepared by a process comprising a coprecipitation reaction in an alkaline medium of a mixture of ferric salt and salt of the divalent metal M, followed by a stabilization treatment of the particles obtained in order to modify their surface by fixing negatively charged organic groups.

In this first embodiment of the invention, it is also possible to carry out the polymerization of the monomer chemically by means of an appropriate oxidizing agent, which can be an inorganic compound, e.g. a persulphate or a metal salt such as ferric chloride, or a charged or uncharged organic compound such as chloranil and dichlorodicyanobenzoquinone (DDQ).

In this case, as hereinbefore operation takes place in the presence of a colloidal suspension of modified magnetic particles, i.e. carrying negatively charged organic groups, in order to also dope the polymer by these particles.

The polymerization reaction is identical to that described hereinbefore for polymerization by electrochemical oxidation and it is also possible to regulate the quantity of magnetic particles introduced into the conductive polymer by adding other doping anions to the medium. At the end of the operation, the doped conductive polymer is recovered in the form of a precipitate which is separated from the solution.

According to a variant, it is possible to carry out the chemical polymerization reaction in a medium incorporating additives making it possible to form a polymer latex, i.e. a suspension of polymer particles with a diameter of approximately 100 nm, which avoids the coagulation of the polymer in the form of a powder. These additives are e.g. hydrolyzed polyvinyl acetate and a surfactant such as sodium dodecyl sulphate. The obtaining of conductive polymer latexes by means of such additives is e.g. described in EP-A-336 468 (Solvay).

The effect of these additives is to prevent the powder coagulation of the polymer, e.g. polypyrrole, during its chemical preparation and lead to the formation of a latex, i.e. a suspension of polymer particles with a diameter of approximately 100 nm. By carrying out, in accordance with the invention, the chemical synthesis of the polymer in the presence of these additives and a colloidal suspension of magnetic particles, it is possible to obtain the inclusion of magnetic colloidal particles in the latex particles. This is possible due to the particle size difference, which is approximately 1 order of magnitude between the large latex particle ($\simeq 100$ nm) and the magnetic colloidal particle ($\simeq 10$ nm).

The media, i.e. the solvents used in the first embodiment of the invention for the chemical or electrochemical polymerization of the precursor monomer can be of different types and in particular depend on the solubility and stability of the monomer and the colloidal suspension of magnetic particles used.

In the case of magnetic particles formed from the oxide $Fe_2MO_4$ representing a divalent metal atom such as Fe, Co or Mn, and a monomer constituted by pyrrole or one of its substituted derivatives, it is possible to use organic solvents, e.g. acetonitrile, ethyl alcohol, ether, aqueous solvents or mixed solvents (water—acetonitrile, water—methylene chloride). When the monomer is aniline, it is necessary to use an acid medium. When it is thiophene, preference is given to a totally anhydrous medium, although it is also possible to use an emulsion of thiophene in water.

This first embodiment of the process according to the invention is consequently very advantageous because it makes possible, by appropriately choosing the nature of the negatively charged groups fixed to the magnetic particles, to carry out the polymerization of the monomer in the solvent and have the most appropriate conditions, without encountering stability and compatibility problems for the colloidal suspension of magnetic particles used.

Moreover, this process permits a precise checking of the quantity of magnetic particles introduced into the conductive polymer by using, during polymer synthesis, the competition between the magnetic particles and another conventional doping anion.

Thus, by the first embodiment of the invention, it is possible to obtain a film which may or may not be deposited on a support (electrode), or a powder of conductive polymer doped by magnetic particles. Generally the powder or film is washed, followed by drying in vacuo, at an appropriate temperature, which is in particular dependent on the solvent used for washing and the stability of the polymer formed.

Powders can be used as they are, or can be compressed into pellet form, or can fritted with different additives. It is also possible to disperse these powders in a gel.

When the polymer is prepared electrochemically, it is possible to directly use the film deposited on the electrode, or separated from said electrode in order to only recover the conductive polymer doped by the magnetic particles. In the latter case, the film can be used as it is or in the form of a powder following an appropriate grinding.

According to a second embodiment of the process according to the invention, the latter consists of polymerizing a precursor monomer of the electronic conductive polymer in a medium incorporating a colloidal suspension of magnetic particles to which are fixed positively charged organic groups.

This second embodiment is adapted to the case where the total charge of the polymer formed by chemical or electrochemical polymerization of the monomer is negative, due to the presence on the monomer of negatively charged substituents.

In this case, the negative charges of the modified magnetic particles present in the polymerization medium.

As in the first embodiment of the process, polymerization can be carried out chemically or electrochemically in the presence or absence of a conventional electrolyte. When a conventional electrolyte is used. the quantity of magnetic particles dispersed in the polymer is also regulated by appropriately choosing the added electrolyte quantity.

The modified magnetic particles having positively charged organic groups can be prepared by treating with an appropriate complexing agent an aqueous suspension of unmodified particles, such as the magnetic fluids of FR-A-2 461 521.

The complexing agent used is a complexing molecule which, once fixed to the particle, still has at least one ionizable function able to maintain a positive charge on the particle, e.g. a quaternary phosphonium or ammonium function. In this second embodiment of the process, the magnetic particles compensate the negative charge excess compared with those neutralizing the positive doping of the polymer.

An example of a polymer obtained under these conditions is the polypyrrole of formula:

m = 2 to 20

According to a third embodiment of the process according to the invention, the conductive polymer incorporating the magnetic particles is prepared by the polymerization of a precursor monomer chemically bonded to a magnetic particle. As hereinbefore, polymerization can be carried out by chemical or electrochemical oxidation.

Thus, in this third embodiment of the process according to the invention use is made of a precursor monomer chemically bonded to a magnetic particle, which ensures that the particle is directly included in the conductive polymer during polymerization. The magnetic particle can be bonded to the monomer by a covalent bond, an ionic bond or a complexing bond, optionally via a spacing arm.

Thus, firstly it is a question of substituting the precursor monomer by an entity, one of whose ends can be fixed to the surface of the magnetic particles by complexing metal atoms of the particles or by compensating surface charges of these particles. This substitution of the monomer can take place via an aliphatic, aromatic or mixed chain.

When the starting monomer is in accordance with the formula in which X, $R^1$ and $R^2$ have the meanings given hereinbefore, said substitution takes place on $R^1$ or $R^2$. When X represents $NR^3$, it tends to be carried out on $R^3$.

During the polymerization of the thus modified precursor monomer, in the polymer are included conventional doping anions giving the polymer its conductive character.

In this third embodiment of the process according to the invention, it is possible to check the quantity of magnetic particles present in the conductive polymer by carrying out the copolymerization of the precursor monomers chemically bonded to the magnetic particles, with precursor monomers not bonded to the magnetic particles. Thus, by regulating the unbonded monomer quantity in the polymerization medium, it is possible to check the quantity of magnetic particles dispersed in the conductive polymer.

The monomers bonded to magnetic particles used in this third embodiment of the inventive process can be prepared by substituting the precursor monomer by an aliphatic or aromatic chain having at its free end an iron complexing group, e.g. a carbon carrying both a carboxylic acid function and an alcohol function.

Examples of such substituted monomers are those complying with the following formulas:

These modified pyrroles or thiophenes can be obtained from the corresponding alcohols by carrying out the following reactions illustrated in the case of thiophene:

The starting alcohols can be prepared by the process described by Bidan et al, Synth. Met., 15, 1986, 49, certain of them being commercial products.

In this third embodiment of the process according to the invention, it is also possible to substitute the precursor monomer by an aliphatic or aromatic chain having at the end of the chain a charged ionizable group able to compensate the surface charge of a charged magnetic particle.

Examples of such substituted monomers are those in accordance with the formulas:

with
m = 2 to 20
R = alkyl or aryl

On using in the polymerization medium monomers not bonded to magnetic particles, they can be of the same type as the bonded monomers or can be different monomers, which are compatible and polymerizable with the bonded monomers. It is e.g. possible to use pyrrole or 2,2'-biothiophene with bonded substituted thiophene or bonded substituted pyrrole.

The bonded monomers can be prepared by contacting a suspension of magnetic particles and a solution of the monomer substituted by the complexing agent or the ionizable group able to compensate the charges of the suspended particles.

In this third embodiment of the process according to the invention, polymerization can be carried out chemically or electrochemically by using the same media, the same conditions and the same operating procedures as in the first two embodiments. However, in this case, the stoichiometry and electropolymerization conditions could be different, because the particle does not fulfil the function of a doping ion.

According to a fourth embodiment of the process according to the invention, the latter consists of chemically polymerizing a precursor monomer of the electronic conductive polymer in a medium incorporating a colloidal suspension of magnetic particles modified by a surfactant. The presence of the surfactant on the magnetic particles gives them a hydrophobic affinity, which makes it possible to establish a physicochemical bond of the hydrophobic—hydrophobic type with a hydrophobic chain of the precursor monomer.

Thus, the polar heads of the surfactant are placed on the magnetic particle and the hydrophobic chains of the surfactant move away from the particle, so that they can be coupled to the hydrophobic chains of the precursor monomers. For example, the precursor monomer can be an alkyl thiophene such as octyl thiophene and the surfactant can be a triethanol amine salt of a phosphoric acid ester.

This embodiment of the process according to the invention is particularly appropriate for the chemical synthesis of poly(octyl thiophene) according to the process described in EP-A-385 523 and makes it possible to homogeneously disperse magnetic particles in the polymer during its synthesis.

According to a fifth embodiment of the process according to the invention, preparation firstly takes place in a conventional manner of an ion-doped electronic conductive polymer and at least part of the doping ions are then exchanged by contacting the conductive polymer with a suspension of charged magnetic particles having the same charge as the doping ions. Thus, the magnetic particles of the suspension have positive charges when the polymer is overall negatively charged and negative charges when the polymer is doped by anions.

In this case, it is possible to regulate the quantity of magnetic particles included in the conductive polymer by appropriately regulating the magnetic particle concentration of the suspension and the time of contacting the conductive particle with the suspension.

The magnetic particles used in this fifth embodiment of the process according to the invention can also be magnetic particles on whose surface has been fixed complexing agents having an ionizable group, which can be negatively or positively charged. Thus, it is possible to use the same modified magnetic particles as in the first and second embodiments of the inventive processes.

The different embodiments of the process according to the invention are very advantageous because they permit the dispersal of the magnetic particles along the conductive polymer chain and the fixing thereof to said chain by chemical bonds, retaining the intrinsic magnetic properties of these particles, checking the quantity of dispersed particles and obtaining the conductive polymer having magnetic particles in the form of a film, a coating deposited on a support, or a powder.

Other features and advantages of the invention can be gathered from the study of the following illustrative and nonlimitative examples with reference to the attached drawings, wherein show.

EXAMPLE 1: Electrochemical preparation of polypyrrole doped by $\gamma$-Fe$_2$O$_3$ In this example use is made of the first embodiment of the process according to the invention by polymerizing pyrrole in the presence of a suspension of $\gamma$-Fe$_2$O$_3$ particles, whose surface is modified by citrate groups in order to be negatively charged. Said colloidal suspension of charged magnetic particles is prepared as follows. A nitric aid ferrofluid synthesized according to French patent 2, 461 521 constitutes the starting product and is based on Fe$_2$O$_3$ gamma maghemite particles with a concentration in metallic atoms (Fe)=1 mole/l, a total acidity (HNO$_3$) of 0.04 mole/l, a mean particle diameter of 9 nm and a surface charge density of 0.2 C/m$^2$. It is provided by adsorbed protons so that (H$^+$ads)/(Fe)=1.8.10$^{-2}$.

A citric acid solution (20 ml, 0.1 mole/l) is added to this ferrofluid. A precipitate is formed which is washed, resuspended in water (50 ml) and peptized by addition of tetramethyl ammonium hydroxide (4 ml, 1 mole/l). The pH of the solution is close to 7. This suspension of charged particles is then introduced into an acetonitrile-water (80:20 by volume) mixture, so as to obtain a solution with an iron concentration of approximately 0.1 mole/l.

Figure 1:
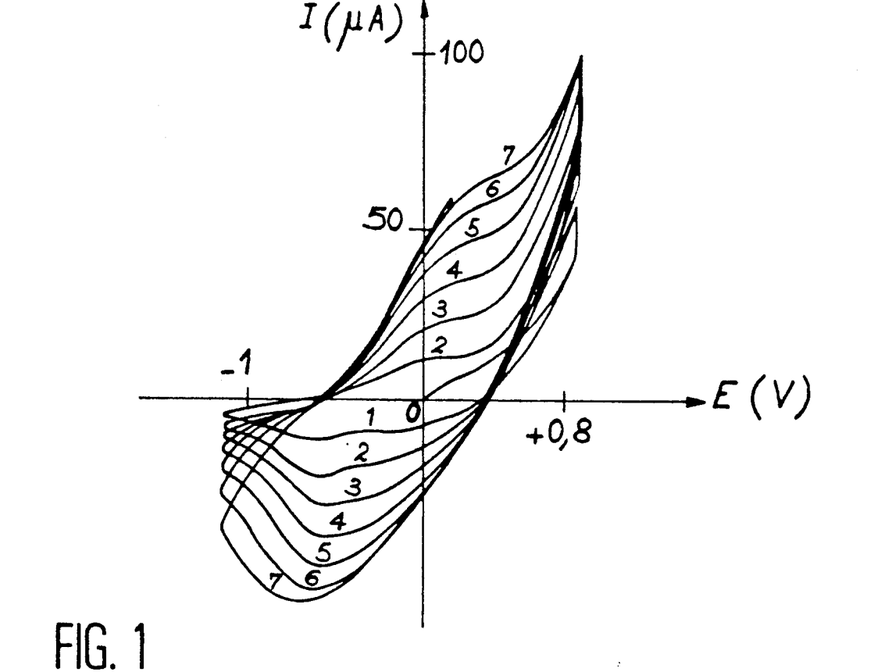
FIGS. 1 and 2 Cyclic voltammetric curves obtained with the material of example 1.

This solution is introduced into a 10 cm$^3$ cell having an arrangement with 3 electrodes, including a working electrode constituted by a diameter 2 mm platinum disk, an auxiliary platinum electrode and an Ag/Ag$^{30}$ $\mu$l of pyrrole in order to maintain a pyrrole concentration of 0.5 mole/l. The solution is degassed by the passage of argon and then the working electrode is raised to a potential of 0.80 V until 6 mC passes into the circuit. The voltammogram is plotted on each occasion that 1 mC passes into the circuit. The results obtained with a 50 mV/s scan are given in FIG. 1 showing the cyclic voltammetric curves of the electrode. Under these conditions, a polypyrrole deposit doped by magnetic particles is formed on the working electrode.

The electrode is then washed in a mixture of acetonitrile and water (80:20 by volume) and then the behaviour of the electrode is studied by cyclic voltamperimetry in a solution constituted by a mixture of acetonitrile and water (90:10 by volume) containing 0.1 mole/l of lithium perchlorate with a 50 mV/s electrode scan.

Figure 2:
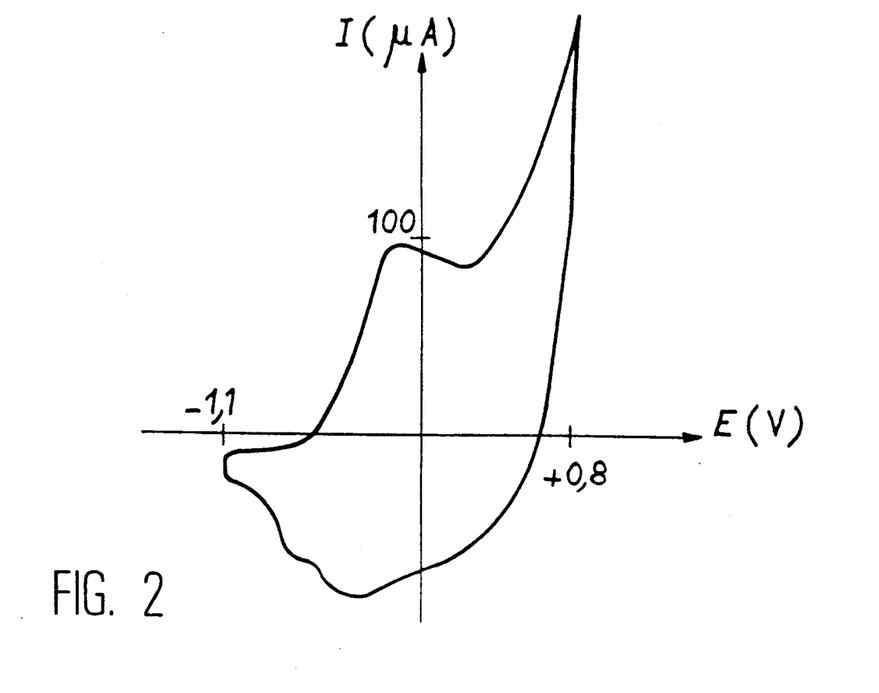

FIG. 2 is the cyclic voltammetric curve obtained and shows that the polypyrrole behaves in the manner of a conductive polymer.

EXAMPLE 2: Electrochemical preparation of polypyrrole doped by $\gamma$-Fe$_2$O$_3$ particles The same suspension of charged magnetic particles as in example 1 is used and introduced into water in order to obtain an iron concentration of approximately 0.1 mole/l. The solution is then introduced into a 10 cm$^3$ cell and it is degassed by slight argon bubbling under magnetic stirring. The pyrrole is then added at a rate of 0.5 mole/l.

Electrochemical polymerization is then carried out using an arrangement with 3 electrodes, including a 6 cm$^2$ working electrode of mixed indium and tin oxide, a stainless steel auxiliary electrode having the same surface and an Ag/Ag$^+$ reference electrode connected to a potensiostat. A current of 0.5 mA/cm$^2$ is imposed on the working electrode until 10.5 C passes into the circuit.

Under these conditions a polypyrrole deposit doped by magnetic particles and with a thickness of 7 $\mu$m is formed on the working electrode. The electrode is then washed with water and acetonitrile 3 times in succession and then the film is separated from the electrode and dried in vacuo at approximately 60° C. The electrical conductivity of the film is measured by the 4 point method and there is a conductivity of 3.4·10$^{-3}$S/cm.

The magnetic properties of the film are studied by SQUID measurements (Superconducting Quantum Interference Device). On the basis of these measurements, it is possible to study the magnetic susceptibility of the material as a function of the temperature and to perform a quantitative dosing of the iron in the doped polymer. In this case, it is found that 4 negative charges belonging to a magnetic macroion are associated with 4 positive charges belonging to the chain of the polypyrrole.

The magnetic susceptibility of this material is constant as a function of the temperature (from 2 to 260K), being approximately 0.06 m$\mu$/g of iron. The electronic paramagnetic resonance (EPR) of the material gives two signals centred at g$\simeq$3, whose line widths are 900 G (Fe) and 3 G (polypyrrole).

EXAMPLE 3: Electrochemical preparation of polypyrrole doped by $\gamma$-Fe$_2$O$_3$ modified by calconcarboxylic acid (PPyFFCC)

In this example use is made of the first embodiment of the process according to the invention with a suspension of $\gamma$-Fe$_2$O$_3$ particles, whereof the surface is modified by calconcarboxylic acid in order to be negatively charged. The calconcarboxylic acid is in accordance with the formula:

Use is made of the same ferrofluid as in example 1 and the colloidal suspension of charged particles is prepared in the following way. At 70° C. and accompanied by stirring 50 ml of nitrate ferrofluid (2.59 mole/l) are added to 100 ml of a 0.1 mole/l calconcarboxylic acid solution neutralized by NaOH (at 10 mole/l) and stirring and heating at 70° C. are maintained for 90 minutes.

Figure 3:
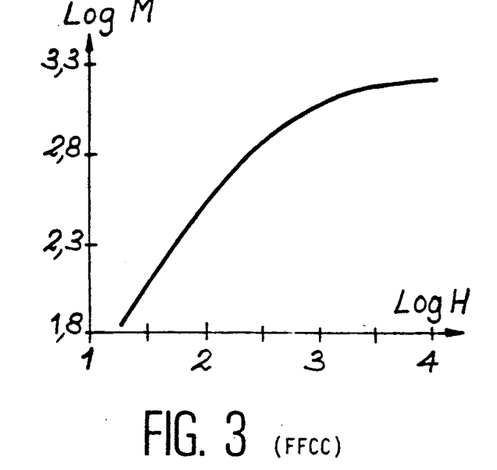
FIG. 3 The magnetic curve of the ferrofluid used in example 3.
Figure 4:
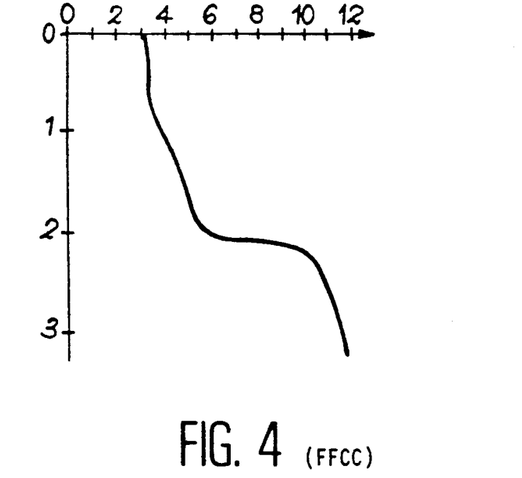
FIG. 4 The protometric curve of the ferrofluid used in example 3.

Following several washings with acetone and ether, a clear stable ferrofluid is obtained, which does not precipitate in the presence of a magnetic field. After stabilizing overnight, the iron concentration is measured with a flowmeter and is found to be 0.8 mole/l. This novel ferrofluid is characterized by the magnetization curve and the protometric curve shown respectively in FIGS. 3 and 4, the magnetization having been determined by FONER.

This ferrofluid is then diluted with an aqueous solution to obtain an iron concentration of approximately 0.1 mole/l.

This is followed by electrochemical polymerization using an arrangement with 3 electrodes, including a 6 cm² mixed indium and tin oxide working electrode, an auxiliary stainless steel electrode with the same surface and an Ag/Ag+ reference electrode connected to a potensiostat. Pyrrole is added to the solution in order to obtain a pyrrole concentration of 0.05 mole/l. The solution is degassed by the passage of argon and then the working electrode is raised to a potential of 0.70 V chosen on the basis of the chronoamperometric curves in FIG. 5. These curves were plotted with aqueous solutions having a pyrrole concentration of 0.5 mole/l and a ferrofluid concentration of 0.4 mole/l.

After the passage of an adequate electricity quantity to form an approximately 23 μm deposit, a polypyrrole film is recovered in which are homogeneously dispersed magnetic particles and the electrical conductivity of the film is determined as it is, together with the conductivity of the materials in the form of a pellet obtained by compression under 800 MPa (8 t/cm²). The conductivities are measured by the 4 point head method.

The results obtained are given in the following table 1.

EXAMPLE 4: Electrochemical preparation of polypyrrole doped by γ-Fe₂O₃ modified by chromium azurol S (PPy-FFAZ)

This example also makes use of the first embodiment of the process according to the invention using a suspension of γ-Fe₂O₃ particles, whose surface is modified by chromium azurol S of formula Use is made of the same ferrofluid as in examples 1 and 3 and the colloidal suspension of charged particles is prepared in the following way.

Figure 6:
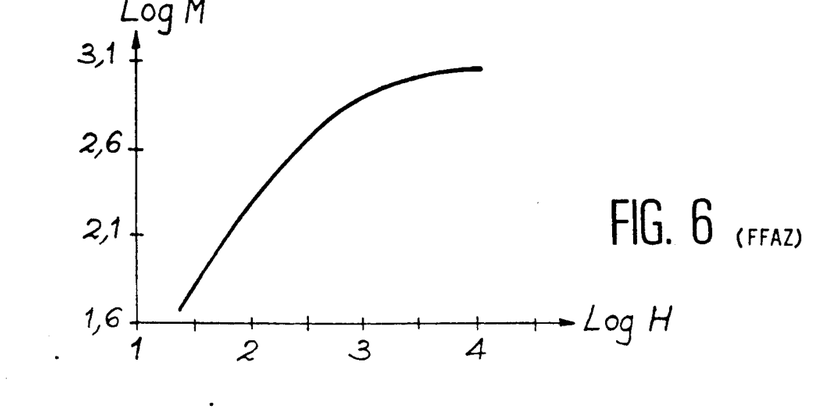
FIG. 6 The magnetization curve of the ferrofluid of example 4.

To 25 ml of 2.59 mole/l nitrate ferrofluid are added 100 ml of a 0.1 mole/l solution of chromium azurol S neutralized to pH 7 by a 1 mole/l NaOH solution and operating at 70° C. accompanied by stirring. In this way the excess chromium azurol S is approximately 20%. Stirring and heating are maintained for 90 minutes and then the precipitate undergoes several washing and precipitation operations as in example 1. This gives a ferrofluid with an iron concentration 0.8 mole/l, determined with the flowmeter. The magnetization curve of this ferrofluid is given in FIG. 6.

Figure 5:
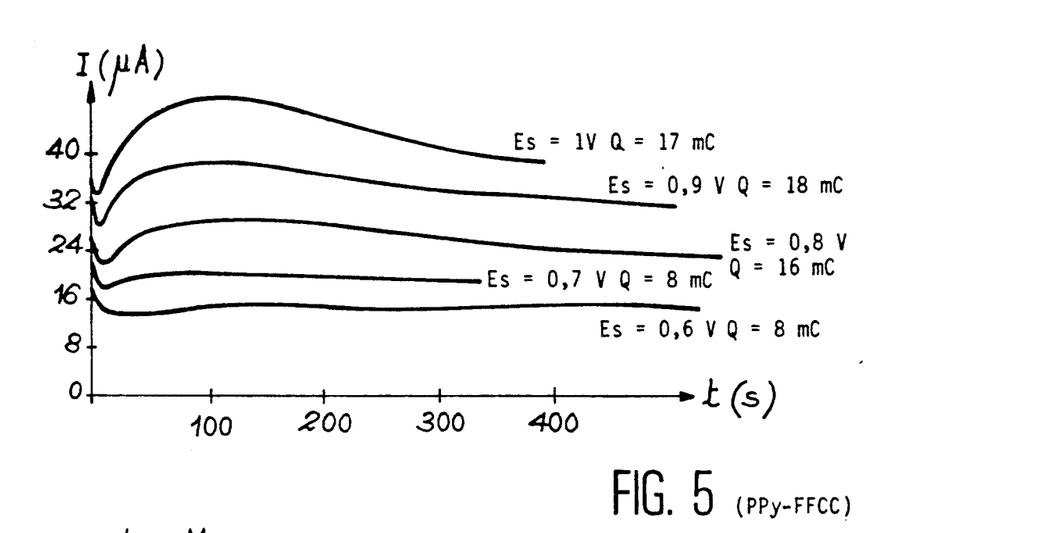
FIG. 5 Chronoamperometric curves obtained with the colloidal suspension of example 3.
Figure 7:
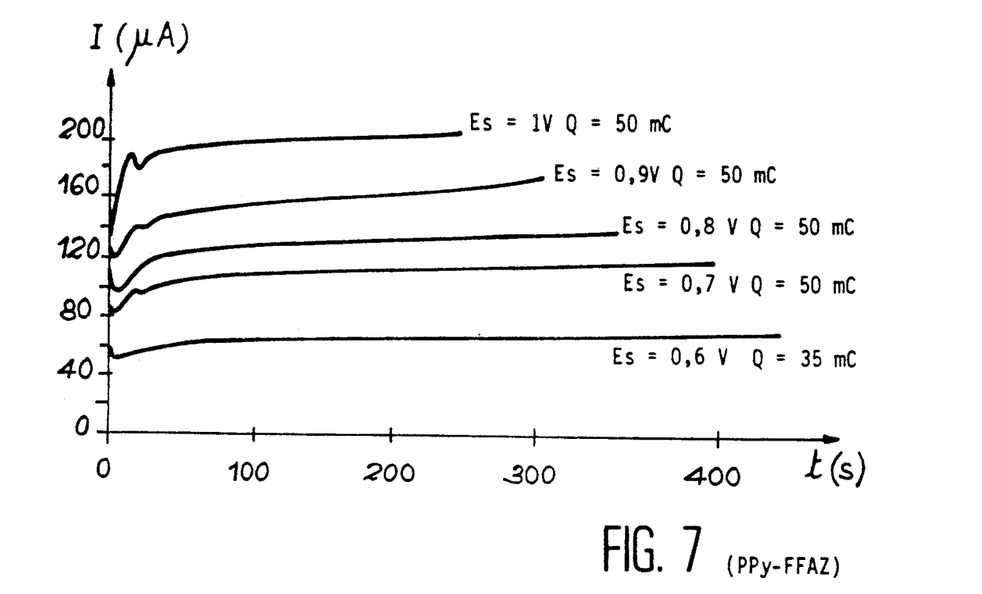
FIG. 7 Chronoamperometric curves obtained with the colloidal suspension of example 4.

The electrochemical synthesis of the polymer is then carried out under identical conditions to those given in example 3, namely using a pyrrole concentration of 0.5 mole/l, an iron concentration of 0.1 mole/l, water as the solvent, a $10^{-2}$ mole/l Ag/Ag+ electrode as the reference electrode and a 0.7 V electrolysis potential, chosen on the basis of the chronoamperometric curves of FIG. 7 plotted under the same conditions as those of FIG. 5.

After the passage of a quantity of electricity corresponding to an approximately 3 μm thick polypyrrole deposit, a film is obtained whose electrical conductivity is measured. Measurement also takes place of the electrical conductivity of the material in the form of pellets obtained by compression under 800 MPa (8 t/cm²). The results obtained are given in the following table 1.

EXAMPLE 5: Electrochemical preparation of polypyrrole doped by γ-Fe₂O₃ modified by citric acid (PPy-FFCit)

The same operating procedure as in examples 3 and 4 is adopted for preparing a polypyrrole film having magnetic particles from a colloidal suspension of charged magnetic particles modified by citric acid prepared in the same way as in example 1 and using for the electrochemical polymerization a pyrrole concentration of 0.5 mole/l, a ferrofluid concentration of 0.1 mole/l in water and by measuring the electrical conductivities of the film and the pellets under the same conditions.

The results obtained are given in table 1. On the basis of these results, it is clear that the electrical conductivities of the films of examples 3 and 4 are respectively approximately 2 and 3 orders of magnitude higher than that of the film of example 5.

Figure 8:
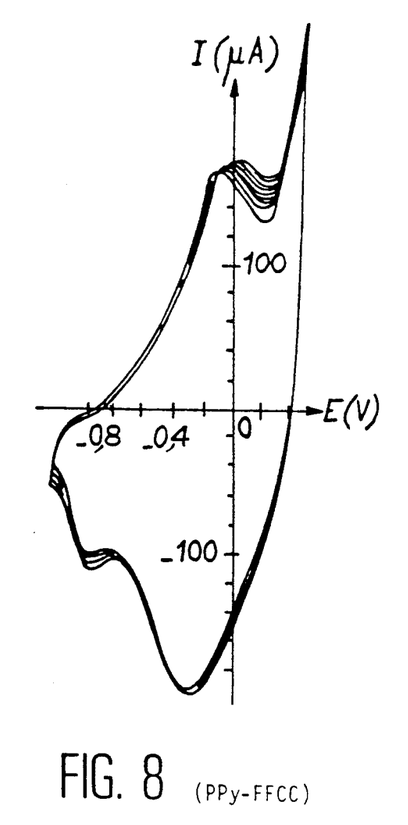
FIG. 8 The cyclic voltammetric curve of the material of example 3.
Figure 9:
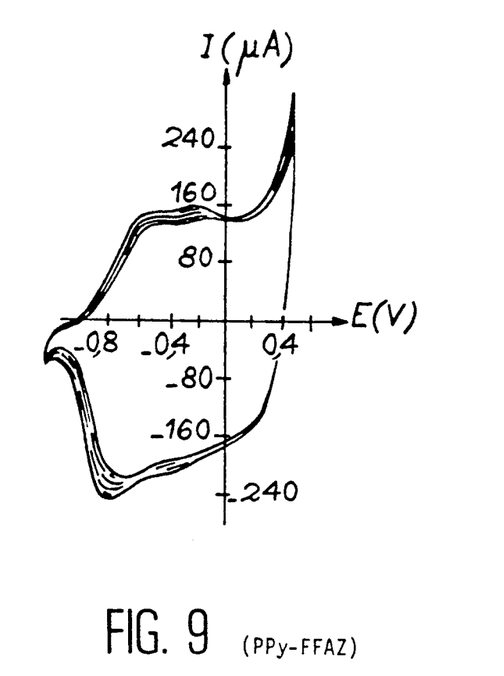
FIG. 9 The cyclic voltammetric curve of the material of example 5.

FIGS. 8 and 9 show the cyclic voltammetric curves of the material PPy-FFCl of example 3 (FIG. 8) and the material PPy-FFAZ of example 4 (FIG. 9). These curves were obtained at a scanning rate of 50 mV/s in an aqueous 0.1 mole/l NalCO₄ solution.

On comparing these cyclic voltammetric curves with that of example 1 (FIG. 2), it can be seen that the electroactivity of the composite materials of examples 3 and 4 is better defined than that of the composite material of example 1 and in particular the stability of the electrochemical cycling. This makes it possible to better check the doping level of the material and consequently adjust the electronic conductivity of these composites.

EXAMPLE 6: Chemical preparation of polypyrrole doped by $\gamma$-$Fe_2O_3$ particles Use is made of the same colloidal suspension of charged magnetic particles as in example 1 and it is introduced with ammonium persulphate into water, so as to obtain an iron concentration of 0.04 mole/l and a persulphate concentration of 0.3 mole/l. This mixture is magnetically stirred with air and pyrrole is added to it in such a way that the ratio of the pyrrole to persulphate concentrations is 1:2.4.

The reaction starts immediately, because a black polymer precipitate appears. Stirring is maintained for 2½ hours and then the mixture is filtered on frit. The precipitate is washed several times with water and acetonitrile to eliminate the oligomers and it is dried in vacuo.

The properties of the precipitate are then studied by infrared spectrometry with Fourier transform and by electronic paramagnetic resonance. In EPR there is a wide line (approximately 800 g), which is characterized of iron. The powder is attracted by a magnet. In infrared spectrometry, there are two characteristic bands of polypyrrole at 918 and 1040 cm$^{-1}$. The same results can be obtained by carrying out the polymerization by adding persulphate to the mixture of pyrrole and magnetic particle suspension.

EXAMPLE 7: Chemical preparation of polypyrrole doped by $\gamma$-$Fe_2O_3$ particles This example uses the same suspension of charged magnetic particles as in example 1 and it is mixed with water to obtain an iron concentration of approximately 0.2 mole/l. To 5 ml of this solution (1 mmole) is added dichlorodicyanobenzoquinone (DDQ), which is insoluble and the solution is magnetically stirred at ambient temperature and in air and then the necessary pyrrole quantity is added thereto, i.e. 1 mmole.

A black precipitate immediately forms and after 12 h contact time, the precipitate is separated by centrifuging and then washed with water and ethyl alcohol using the Soxhlet apparatus. After drying, the powder obtained which reacts on the approach of a magnet is pelletized and its conductivity measured. The latter is 1.7·10$^{-2}$ S/cm for a 0.35 mm thick pellet. The infrared spectrum is characteristic of conductive polypyrrole.

EXAMPLE 8: Chemical preparation of polypyrrole latex doped by $\gamma$-$Fe_2O_3$ particles (PPy-FFCit latex)

For this synthesis use is made of the same colloidal suspension as in example 5, i.e. $\gamma$-$Fe_2O_3$ particles modified by citrate and the following procedure is adopted to obtain the doped polymer latex.

In a 100 ml Erlenmeyer flask preparation takes place of 88% hydrolyzed polyvinyl acetate solution (molecular weight 120,000) in 10 ml of water, which corresponds to 3.4·10$^{-3}$ mmole of acetate. To this solution is added 5 ml of a 0.4 mole/l sodium dodecyl sulphate solution and then a 6 $H_2O$ $FeCl_3$ ferric chloride solution to obtain a concentration of 2.2 mole/l.

To this magnetically stirred solution is added dropwise in 10 minutes a mixture of 0.31 ml of pyrrole and 0.6 ml of colloidal suspension of example 5 with a concentration of 1 mole/l in 5 ml of water and stirring is maintained at 20° C. for 1 h. The latex obtained is centrifuged at 3200 r.p.m. and washed with water until the supernatant solution is colourless. The latex is then deposited on a glass plate and spread out with the spatula. The film is dried in air and ambient temperature for 14 h. This gives a black, hard, separable film with a bright appearance and which is relatively brittle. The infrared spectrometry of the film (KBr) shows the characteristic bands of the polypyrrole matrix at 1160 to 1170 and 1030 to 1040 cm$^{-1}$.

The thickness of the film is also determined with a thickness comparator and its conductivity is determined by the 4 point method. The result obtained is given in table 2.

EXAMPLE 9: Chemical preparation of polypyrrole latex doped by $\gamma Fe_2O_3$ particles (PPy-latex-FFCC)

The same operating procedure as in example 8 is used, but the colloidal suspension of example 3 is used as the ferrofluid. The results obtained are given in table 2.

EXAMPLE 10: chemical preparation of polypyrrole latex doped by $\gamma$-$Fe_2O_3$ particles (PPy-latex-FFAZ)

The same operating procedure as in example 8 is used, but using the colloidal suspension of example 4 as the ferrofluid. The results obtained are given in table 2.

COMPARATIVE EXAMPLE

The same operating procedure as in example 8 is used, but polymerization is carried out without adding ferrofluid. The results obtained are also given in table 2.

On the basis of these results, it can be seen that the presence of magnetic particles in the polypyrrole latex greatly reduces the conductivity in the case where the particles are modified by citrate (example 8). This significant conductivity loss is probably due to the citrate doping agent, because this phenomenon has already been observed by electrochemically obtained polymers.

However, the presence of magnetic particles modified by calconcarboxylic acid or chromium azurol S only modifies very slightly the conductivity of the polymer, because it is similar to the conductivity of the polypyrrole latex not containing a ferrofluid and is ten times greater than that of the electrochemically obtained materials (examples 3 and 4). The films obtained have good magnetic properties and are attracted by a magnet.

EXAMPLE 11: Chemical preparation of poly(octylthiophene) containing $\gamma$-$Fe_2O_3$ particles modified by a surfactant In this example use is made of the fourth embodiment of the process of the invention, i.e. the modification of the magnetic particles by a surfactant or amphiphilic molecule making it possible to give the particles an affinity for hydrophobic chains. Thus, use is made of the nitrate ferrofluid of example 1 and it is treated by a surfactant having a polar head and a hydrophobic tail, constituted by a triethanol amine salt of a phosphoric acid ester in order to coat each $\gamma$-$Fe_2O_3$ particle with said amphiphilic molecules (surfactant). The thus treated ferrofluid is soluble in $CHCl_3$, which is the medium used for octylthiophene polymerization.

In order to prepare the modified ferrofluid, the precipitate obtained from the nitrate ferrofluid used in example 1 is dissolved in water and to it is added the anionic surfactant constituted by a triethanol amine salt of a phosphoric acid ester using a 20 molar % surfactant excess. The mixture is stirred hot for 10 min. After precipitating with acetone and magnetic settling, the precipitate is washed 3 times with methanol and is then dissolved in a mixture of CHCl₃ and methanol (3:1 by volume) and slowly the methanol is expelled by heating.

In a 4-necked reactor cooled to 5° C. and equipped with two addition flasks, a thermometer and an argon intake is introduced 85 ml of CHCl₃, which has been deoxygenated by argon bubbling and then, accompanied by magnetic stirring, 9.4 g of anhydrous FeCl₃ are added and then the mixture is again degassed for 10 min.

In each flask is respectively placed 2 ml of degassed distilled water and 1 ml of modified ferrofluid at a concentration of 1 mole/l, 1.1 ml of 3-octylthiophene and 15 ml of CHCl₃, everything being purged with argon.

In parallel, the content of the two flasks is introduced in a few minutes and stirring is maintained at 5° C. for 90 minutes. To the mixture is added dropwise 15 ml of acetonitrile over 15 min. The product of the reaction is filtered on frit no. 4 and then washed 3 times with acetonitrile until the filtrate becomes colourless. The precipitate is dried in vacuo for 5 h and in this way 900 mg of precipitate are obtained. After fritting a pellet is obtained with a conductivity of 1.74 S·cm⁻¹ which is attracted by a magnet.

EXAMPLE 12: Preparation of polypyrrole-ferrofluid composite materials with covalent bonding between the chains of the polymer and the magnetic particles This example uses the third embodiment of the invention, namely the polymerization of pyrrole chemically bonded to a magnetic particle. To obtain this bond, the pyrrole is modified so as to fix it to a SH complexing group and in this way the pyrrole with the following formula is obtained:

1) 11-(pyrrole-1-yl)undecane thiol synthesis
a) 1-tosyl-11-(pyrrole-1-yl)undecane synthesis Gentle addition takes place in a glove box of 2.24 ml (3.6·10⁻³ mole) of 1.6 mole/l of n-butyl lithium in hexane to 851 mg (3.59·10⁻³ mole) of 11-(pyrrole-1-yl)undecanol dissolved in 10 ml of tetrahydrofuran. This solution is then added to a tosyl chloride solution (684 mg, 3.6·10⁻³ mole) in 10 ml of THF. After stirring for 30 min the mixture is removed from the glove box and evaporated to dryness. It is then taken up with a 50:50 ether and Na₂CO₃-saturated water mixture. The organic phase is recovered and the aqueous phase washed 3 times with ethyl ether. After drying on Na₂SO₄, the oil obtained is crystallized in an ethyl alcohol/petroleum ether mixture.

b) 1-iodo-11(pyrrole-1-yl)undecane synthesis 500 mg (1.28·10⁻³ mole) of product obtained in a) and 395 mg (3.84·10⁻³ mole) of NaI are dissolved in 20 ml of ethylene glycol dimethyl ether and refluxed with magnetic stirring for 90 min. After returning to ambient temperature, the sodium tosylate precipitate is filtered and washed with chloroform. To the filtrate are added 2 spoonfuls of sodium bisulphate and filtering then again takes place on frit.

c) 11-(pyrrole-1-yl)undecane thiol synthesis 385 mg (1.28·10⁻³ mole) of the product obtained in stage b) dissolved in 20 ml of ethyl alcohol are mixed with 97 mg of thiourea in 5 ml of water. The solution is refluxed for 23 h, then degassed with argon, followed by the addition of 52 mg (2.56·10⁻³ mole) of NaOH in 20 ml of water. After refluxing for 3 h, the reaction mixture is brought to 5° C., followed by the addition of a dilute H₂SO₄ solution to arrive at a pH of 2. The product is then extracted with chloroform and washed with water. A rapid filtration on frit with silica gives 11-(pyrrole-1-yl) undecane thiol.

2. Preparation of polypyrrole incorporating magnetic γ-Fe₂O₃ particles

Firstly a colloidal suspension of magnetic particles modified by 11-(pyrrole-1-yl)undecane thiol obtained previously is prepared. To this end, to the nitric acid ferrofluid of example 1 is added 11-(pyrrole-1-yl)undecane thiol in an adequate quantity to modify each Fe₂O₃ particle. This is followed by several washing and precipitation operations using acetone and ether and solubilization takes place in chloroform.

Polymerization is then performed in the following way. To 100 ml of a b 0.1 mole/l solution of ferrofluid modified by the previously obtained pyrrole are added 100 ml of a 0.1 mole/l unsubstituted pyrrole solution, then 20 ml of a 2.3 mole/l FeCl₃ solution. The precipitate is filtered, washed with water and acetonitrile. After fritting the powder, a pellet with conductivity of approximately 10 S·cm⁻¹ is obtained.

TABLE 1

| | | Film | | Pellet | |
|---|---|---|---|---|---|
| Ex. | Film Type | Thickness e (μm) | Electrical Conductivity (S × cm⁻¹) | Thickness (μm) | Electrical Conductivity (S × cm⁻¹) |
| 5 | PPy-FFCit | 8 | 0.6 × 10⁻³ | 17 | 0.7 × 10⁻² |
| 4 | PPy-FFAZ | 3 | 2.1 | 31 | 0.4 |
| 3 | PPy-FFC | 23 | 0.10 | 20 | 0.54 |

TABLE 2

| Ex. | Material | Thickness (μm) | Electrical Conductivity (S × cm⁻¹) |
|---|---|---|---|
| comp. | PPy-latex | 34 | 13.3 |
| 8 | PPy-latex-FFCit | 31 | 2.0 × 10⁻² |
| 9 | PPy-latex-FFCC | 31 | 11.1 |
| 10 | PPy-latex-FFAZ | 93 | 3.8 |

We claim:

1. Process for the preparation of an electricity conducting material including an electronic conductive polymer having homogeneously dispersed permanent magnetic oxide particles chemically or physicochemically bonded to the polymer, said particles acting as a dopant for said polymer, comprising the steps of providing a medium incorporating a colloidal suspension of magnetic oxide particles on which are fixed negatively charged organic groups and oxidatively polymerizing a precursor monomer of the electronically conductive polymer in said medium, said negatively charged organic groups being complexing agents having functional groups selected from the group consisting of —COO⁻, —SO₃⁻, —OSO₃⁻ and —PO₄²⁻.

2. Process for the preparation of an electricity conducting material including an electronic conductive polymer having homogeneously dispersed permanent magnetic particles chemically or physicochemically bonded to the polymer, said particles acting as a dopant for said polymer, comprising the steps of providing a medium incorporating a colloidal suspension of magnetic particles on which are fixed positively charged organic groups and oxidatively polymerizing a precursor monomer of the electronically conductive polymer in said medium, said positively charged organic groups being complexing agents having functional groups selected from the group consisting of quaternary phosphonium and quaternary ammonium ions.

3. Process according to claim 1, characterized in that polymerization takes place by electrochemical oxidation using as the electrolyte the colloidal suspension of magnetic particles.

4. Process according to either of the claims 1 or 2, characterized in that polymerization is carried out by chemical oxidation.

5. Process according to claim 4, characterized in that the medium also comprises additives making it possible to form a polymer latex, wherein said additives are such as to avoid coagulation of the polymer in powder form.

6. Process according to claim 3, wherein another electrolyte is added to the polymerization medium so that there is a competition between the magnetic particles and the ions of the added electrolyte for positively charged sites of the polymer, and wherein the quantity of magnetic particles dispersed in the polymer is controlled by selecting the quantity of electrolyte which is added.

7. Process according to claim 1, characterized in that the complexing agent is chosen from among citric acid and the compounds of formulas:

8. An electricity conducting material produced according to the process of either of claims 1 or 2.

9. An electricity conducting material produced according to the process of claim 3.

10. An electricity conducting material produced according to the process of claim 4.

11. An electricity conducting material produced according to the process of claim 5.

12. An electricity conducting material produced according to the process of claim 6.

13. An electricity conducting material produced according to the process of claim 7.

14. A process according to claim 2 characterized in that polymerization takes place by electrochemical oxidation using as the electrolyte the colloidal suspension of magnetic particles.

15. Process according claim 14 wherein another electrolyte is added to the polymerization medium so that there is a competition between the magnetic particles and the ions of the added electrolyte for negatively charged sites of the polymer, and wherein the quantity of magnetic particles dispersed in the polymer is controlled by selecting the quantity of electrolyte which is added.

* * * * *

UNITED STATES PATENT AND TRADEMARK OFFICE
CERTIFICATE OF CORRECTION

PATENT NO. : 5,264,157

DATED : November 23, 1993

INVENTOR(S) : Gerard Bidan et al.

It is certified that error appears in the above-identified patent and that said Letters Patent is hereby corrected as shown below:

Column 6, line 21, after "$FE_2MO_4$" insert --with M--.

Column 7, line 8, after "the" (second occurrence) insert --polymer are compensated by the positive charges of the--.

Column 11, line 19, delete "magnetic" and insert --magnetization--.

Column 11, line 62, delete "$Ag/Ag^{30}$" and insert --$Ag/Ag^+$ reference electrode. To the solution are added 340--.

UNITED STATES PATENT AND TRADEMARK OFFICE
CERTIFICATE OF CORRECTION

PATENT NO. : 5,264,157
DATED : November 23, 1993
INVENTOR(S) : Gerard Bidan et al.

It is certified that error appears in the above-identified patent and that said Letters Patent is hereby corrected as shown below:

Column 12, line 33, delete "passes" and insert --pass--.

Column 13, line 41, delete "0.05" and insert --0.5--.

Column 14, line 66, delete "NalCO₄" and insert --NaClO₄--.

Column 15, line 51, delete "characterized" and insert --characteristic--.

Column 17, line 35, delete "it to" and insert --to it--.

Column 18, line 26, delete "b".

Signed and Sealed this

Thirty-first Day of January, 1995

Attest:

BRUCE LEHMAN

Attesting Officer

Commissioner of Patents and Trademarks

UNITED STATES PATENT AND TRADEMARK OFFICE
CERTIFICATE OF CORRECTION

PATENT NO. : 5,264,157
DATED : November 23, 1993
INVENTOR(S) : Gerard Bidan et al.

It is certified that error appears in the above-identified patent and that said Letters Patent is hereby corrected as shown below:

On title page, item [73] Assignee: should read:

--Commissariat a l'Energie Atomique, and Solvay & Cie, Societe Anonyme, both of France--.

Signed and Sealed this

Tenth Day of October, 1995

Attest:

BRUCE LEHMAN

Attesting Officer     Commissioner of Patents and Trademarks